Patented Nov. 1, 1938

2,135,128

UNITED STATES PATENT OFFICE 2,135,128

MANUFACTURE OF DERIVATIVES OF CELLULOSE AND OTHER POLYMERIC HYDROXY COMPOUNDS

Edward Boaden Thomas and Horace Finningley Oxley, Spondon, near Derby, England, assignors to Celanese Corporation of America, a corporation of Delaware No Drawing. Application August 12, 1936, Serial No. 95,624. In Great Britain September 23, 1935

5 Claims. (Cl. 260—152)

This invention relates to improvements in the manufacture of derivatives of cellulose and other polymeric hydroxy compounds, and particularly to improvements in the manufacture of ethers of such compounds.

Processes have hitherto been proposed for the manufacture of ethers of the above compounds by reacting such compounds with an etherifying agent in the presence of a diluent such as benzene, or alcohol, or in the absence of a diluent. Difficulties, however, have been experienced in obtaining a uniformly etherified product which yields a clear solution in suitable solvents.

It has now been discovered that by carrying out the etherification in the presence of an inert diluent which is at least substantially miscible with water, products of a more uniform nature and improved solubility may be obtained. As examples of diluents which may be employed, mention may be made of methyl acetate, methyl ethyl ketone, acetone, dioxane and methylene ethylene ether. Preferably diluents which are miscible with water in all proportions are employed. It is also of advantage that the diluent shall be a solvent for the catalyst, if any, employed and for the ether formed.

The process of the present invention is particularly valuable in relation to the manufacture of oxy-alkyl ethers of cellulosic materials by reaction with alkylene oxides and will therefore be described with particular reference thereto, though it is also applicable to the manufacture of other cellulose ethers and of ethers of starch and other polymeric hydroxy compounds. Any suitable cellulosic materials may be etherified according to the process of the present invention, for example mechanical or chemical wood pulps, regenerated cellulose, e. g. viscose yarn, cotton and cellulose derivatives containing free hydroxy groups, for example partially etherified and esterified celluloses and cellulose derivatives containing hydroxy groups in the substituent radicles, for example cellulose glycollate and oxyethyl-cellulose. Further, cellulose derivatives containing no free hydroxy groups may be etherified according to the present invention under suitable conditions, by substitution of the ether groups for substituent groups already present in the cellulose derivative. For example cellulose acetate and other cellulose esters may be etherified in the presence of caustic soda or other base which splits off ester groups and at the same time acts as a catalyst for the etherification.

The present invention is particularly concerned with the manufacture of oxy-alkyl cellulose ethers which are of low viscosity and are soluble in water or dilute alkaline solutions. Such ethers may be obtained, for example, by etherification with ethylene oxide, propylene oxide or other alkylene oxide, or with glycide and similar compounds containing alkylene oxide radicles.

The cellulosic material may be pretreated in order to render it more suitable for etherification, e. g. it may be treated with 3–10% sulphuric acid or other mineral acid for several hours at 40°–80° C. or even more.

Preferably, etherification according to the present invention is carried out in the presence of a suitable catalyst which may be acid or basic. In general basic catalysts, and particularly strong inorganic bases such as caustic soda and caustic potash, yield the best results.

In addition to strong inorganic bases such as caustic soda and caustic potash there may be employed other inorganic bases, e. g. ammonia, and organic bases, for example mono- or dimethylamine or ethylamine, aniline, tetramethyl ammonium hydroxide and particularly ethylene diamine. The catalyst may be incorporated in the cellulosic material prior to its treatment with the etherifying agent or the catalyst may be applied in admixture with the etherifying agent and/or with the organic diluent. In general, when solid bases such as caustic soda and caustic potash are employed as catalysts, it is preferable to incorporate the base with the cellulosic material prior to etherification, for example by soaking the material in a solution of the base, preferably of a concentration of about 10–25%, e. g. 15%, followed by pressing out and drying, or by incorporating with the cellulosic material an aqueous solution of caustic alkali containing the amount of alkali desired in the alkali cellulose to be etherified. For example 10 parts by weight of wood pulp may be milled with about 25 parts by weight of an approximately 16% solution of sodium hydroxide. Smaller proportions of caustic alkali may be employed, for example proportions of 10 to 20 per cent. based on the weight of the cellulosic material, but in general it is found necessary that with proportions of this order etherification should be carried out at fairly high temperatures, for example 50 to 70° C., if products which are soluble in water or of low viscosity are desired. If a volatile catalyst is employed, for example a volatile organic amine, it may be dissolved in the diluent or introduced in vapour form in admixture with the etherifying agent, if the agent is applied in such form.

The use of water-miscible diluents is of particular value when the etherification mixture contains water, as, for example, when an alkali cellulose prepared by working cellulosic materials with aqueous alkali is to be etherified.

The diluent employed may depend to some extent upon the nature of the catalyst. For example, saponifiable compounds such as methyl acetate are not in general suitable for use with catalysts having a saponifying action, such as caustic soda.

In order to assist in obtaining a uniform product, the cellulosic material, particularly if it is in the form of alkali cellulose, may be disintegrated before etherification and preferably before ripening, if such takes place. Such disintegration may be effected by milling the material in a Werner Pfleiderer mill for 5–10 up to 15 or 20 hours or even more, according to the type of material and the degree of disintegration desired. The temperature should be kept low, e. g. 15–20° C. if it is desired to avoid degradation and the consequent production of products of low viscosity.

The conditions of the reaction according to the present invention may be controlled according to the type of product desired. For example, if it is desired to produce an oxy-alkyl cellulose which is of relatively high viscosity, the reaction is preferably carried out at relatively low temperatures and the catalyst employed and the conditions under which it is applied should be such as to avoid any substantial degradation of the cellulose. Thus, when the catalyst employed is caustic soda or other strong inorganic base, the cellulosic materials may be impregnated with the base at temperatures not substantially exceeding atmospheric temperature and are preferably etherified shortly after the treatment with the base.

On the other hand, if it is desired to obtain products of low viscosity which are soluble in water or dilute alkali, e. g. dilute ammonia, the conditions may be chosen to facilitate this process. Thus the ripening of alkali cellulose, for several weeks before etherification, tends to improve the uniformity and reduce the viscosity of the products as does milling the alkali cellulose at raised temperatures, e. g. 40°–50° C., for periods of e. g. 9–15 hours or more, according to the reduction in viscosity which is required. Preferably milling is effected under such conditions that evaporation of water can take place, as otherwise the mass may become pasty and impermeable, in which state uniform reaction with the etherifying agent is difficult to attain.

Etherification may be carried out at ordinary temperatures or relatively low temperatures, for example 25 to 35° C., or at considerably higher temperatures, for example 50 to 70° C., according to the properties desired in the cellulose ether and the previous treatment of the cellulosic material. As explained above, milling at raised temperatures, ripening of alkali cellulose and etherification at high temperatures, for example 60° C., all tend to decrease the viscosity of the product obtained and increase its solubility in water, and by varying the conditions to which the alkali cellulose is subjected and under which it is etherified, the properties of the products obtained may be controlled.

A hydroxy ether of cellulose, which is very suitable for use as a size, may be obtained by impregnating cellulosic material with a 10 to 20%, for example 15%, solution of caustic soda, centrifuging until the mass has a weight of about 300 to 400% its original weight, allowing the centrifuged mass to ripen for two to four weeks and then reacting it in a suitable vessel with ethylene oxide, in an amount about equal to about 60–80% of the original weight of the cellulose, dissolved in about ten times its weight of acetone, the temperature being maintained at about 25°–35° The vessel is continuously rotated during the reaction, which, under the above conditions requires about 15–20 hours.

When etherification according to the present invention is carried out in the presence of caustic soda or similar base as a catalyst, the reaction product obtained consists in general of a mass containing sodium hydroxide mixed with the cellulose ether and by-products and may be worked up in various ways according to the properties of the cellulose ether and the purpose for which it is desired. For example, when the ether is water-soluble but is insoluble in methylated spirit it may be purified by extraction with methylated spirit. Removal of caustic soda by this method may be facilitated by converting the caustic soda into sodium acid acetate, or into sodium chloride. On the other hand, a water-insoluble ether may be purified by extraction with water, or by dissolving it up in a suitable solvent. For some purposes caustic soda, instead of being removed, may be converted into a substance which is useful, or at least not objectionable, in the process for which the cellulose ether is to be employed. For example, when the ether is to be employed as a size it may be treated with acetic, oleic or boric acid so as to convert the caustic soda into sodium acetate, oleate or borate. Any solids, including precipitated sodium salt, may then be filtered off and the solution of the ether brought to the desired concentration for use as a size.

The following is an example of purification with boric acid. An etherification mixture in which acetone has been employed as a diluent and which contains oxyethyl cellulose is treated by draining off as much as possible of the acetone and then centrifuging the remainder, preferably while it is subjected to agitation and a slow current of air is passed through it. The residue is then milled cold with gradual addition of water until a viscous solution is obtained which is then treated with the required amount of boric acid for neutralization of the caustic alkali to borax. Milling is continued for 30 minutes to 1 hour until a mixture of crystals of borax with the viscous solution is obtained. The crystals are filtered off by means of a filter press and the oxyethyl cellulose may then be recovered from the filtrate, or the filtrate may be brought to the desired concentration and employed directly as a size or for any other suitable purpose.

Again, the mass may be freed from mineral matter by a process of electro-osmosis, a solution of the mass being treated in a cell having a semipermeable membrane, the cathode being outside the cell and being continuously washed.

The invention has been described above with reference to the production of oxy-alkyl compounds by means of alkylene oxides since it is particularly valuable in this connection. The use of diluents which are substantially or completely water-miscible is, however, also of value in etherification processes in general using, e. g., as etherifying agents, epichlorhydrin, ethylene chlorhydrin, glycerol chlorhydrin and other chlorhydrins, halogenated fatty acids or salts thereof, e. g. chloracetic acid and sodium chloracetate, and alkyl or aralkyl halides and sulphates, e. g. dimethyl sulphate and ethyl and benzyl chlorides. Thus a cellulose-glycollic acid which is soluble in dilute ammonia, and which is suitable for use as a size, may be obtained in the following manner. About 10 parts by weight of unbleached sulphite pulp or other cellulosic material is soaked in excess of a 20% solution of caustic soda, is then pressed out to about 35 parts by weight and after ripening for 6–8 weeks and milling for 12–24 hours in a Werner-Pfleiderer mill is reacted in a Werner-Pfleiderer mill with about 20 parts by weight of sodium mono-chloracetate in the form of 50% aqueous solution in the presence of acetone as a diluent. The reaction is continued for 15 to 20 hours at the end of which the mass containing the cellulose-glycollic acid may be worked up in any suitable manner.

When etherifying agents, such as dimethyl sulphate and ethyl chloride, which yield acid during the reaction are employed, basic catalysts should in general be used in sufficient quantities to maintain the etherification mixture alkaline during the reaction.

Having described our invention, what we desire to secure by Letters Patent is:—

1. Process for the manufacture of oxyalkyl ethers and carboxy-alkyl ethers of cellulose, which comprises reacting cellulosic material with an etherifying agent selected from the group consisting of oxyalkyl and carboxyl-alkyl etherifying agents in the presence of acetone as diluent.

2. Process for the manufacture of oxyalkyl ethers and carboxy-alkyl ethers of cellulose, which comprises reacting cellulosic material with an etherifying agent selected from the group consisting of oxyalkyl and carboxy-alkyl etherifying agents in the presence of alkali and acetone as diluent, and neutralizing the etherification mixture after completion of etherification with an acid selected from the group consisting of boric acid and acetic acid.

3. Process for the manufacture of oxyalkyl cellulose ethers, which comprises reacting cellulosic material with an oxyalkylating agent in the presence of acetone as diluent.

4. Process for the manufacture of carboxy-alkyl cellulose ethers, which comprises reacting cellulosic material with a carboxy-alkylating agent in the presence of acetone as diluent.

5. Process for the manufacture of oxyethyl cellulose, which comprises reacting cellulosic material with ethylene oxide in the presence of caustic alkali using acetone as a diluent.

EDWARD BOADEN THOMAS.
HORACE FINNINGLEY OXLEY.